United States Patent
Benameur et al.

(10) Patent No.: US 10,114,947 B1
(45) Date of Patent: Oct. 30, 2018

(54) SYSTEMS AND METHODS FOR LOGGING PROCESSES WITHIN CONTAINERS

(71) Applicant: Symantec Corporation, Mountain View, CA (US)

(72) Inventors: Azzedine Benameur, Fairfax, VA (US); Nathan Evans, Sterling, VA (US); Yun Shen, Bristol (GB)

(73) Assignee: Symantec Corporation, Mountain View, CA (US)

( * ) Notice: Subject to any disclaimer, the term of this patent is extended or adjusted under 35 U.S.C. 154(b) by 182 days.

(21) Appl. No.: 15/197,672

(22) Filed: Jun. 29, 2016

(51) Int. Cl.
*H04L 29/00* (2006.01)
*G06F 21/55* (2013.01)
*G06F 21/56* (2013.01)

(52) U.S. Cl.
CPC .......... *G06F 21/552* (2013.01); *G06F 21/554* (2013.01); *G06F 21/56* (2013.01); *G06F 2221/034* (2013.01)

(58) Field of Classification Search
CPC ....... G06F 21/552; G06F 21/554; G06F 21/56
USPC .......................................................... 726/23
See application file for complete search history.

(56) References Cited

U.S. PATENT DOCUMENTS

2014/0304836 A1* 10/2014 Velamoor ........... G06F 21/6209
726/28

FOREIGN PATENT DOCUMENTS

WO    WO 2015039564 A1 * 3/2015 ........... G06F 17/303

OTHER PUBLICATIONS

Massimiliano Mattetti, Alexandra Shulman-Peleg, Yair Allouche, Antonio Corradi / Automatic security hardening and protection of linux containers/ Sep. 2015/ pp. 1-15.*
Gaurav Makin et al.; Systems and Methods for Rerouting Data Sent Between Application Containers and Storage Containers; U.S. Appl. No. 15/014,046, filed Feb. 3, 2016.
Twistlock; https://www.twistlock.com/; Dec. 8, 2003.
Resin.io; https://resin.io/; Nov. 11, 2013.
CRIU; https://criu.org/Main_Page; Feb. 6, 2012.
Fanotify—monitoring filesystem events; http://man7.org/linux/man-pages/man7/fanotify.7.html; May 27, 2014.

* cited by examiner

*Primary Examiner* — Brandon S Hoffman
*Assistant Examiner* — Michael D Anderson
(74) *Attorney, Agent, or Firm* — FisherBroyles, LLP

(57) ABSTRACT

The disclosed computer-implemented method for logging processes within containers may include (i) detecting creation of a new container that comprises a lightweight platform-independent filesystem capable of executing at least one process that is isolated from a host computing device that hosts the container, (ii) launching, within the new container, a monitoring process that maintains a log of events associated with a process that will be executing within the new container, (iii) recording to the log, by the monitoring process, data about at least one event associated with the process executing within the container, and (iv) exporting, by the monitoring process, the log to the host computing device that hosts the new container. Various other methods, systems, and computer-readable media are also disclosed.

20 Claims, 7 Drawing Sheets

Log
402 type: file_creation
timestamp: 1465512789191
permissions: RW
process_name: exampledoceditor.exe
file_name: example.doc type: process_launch
timestamp: 1465512942763
permissions: RWX
process_name: exampledoceditor.exe
launched_proc_name: examplebrowser.exe

SYSTEMS AND METHODS FOR LOGGING PROCESSES WITHIN CONTAINERS

BACKGROUND

In the past, large-scale computing projects were limited to individuals and enterprises that owned large physical data centers with towering racks of computers. Now, distributed computing allows anyone with the resources to buy server space to run as many instances of their preferred computing device as desired. Further efficiency improvements have been introduced in the form of application containers that allow administrators to run applications without requiring the resources necessary to simulate an entire virtualized operating system for each virtualized application. Containers may reduce the processing requirements for each application, allowing greater numbers of applications to be run on the same host. Containers are often used for short-lived operations and may be used for as little as minutes. In this context it is difficult, if not impossible, to provide a fine-grained view as to what happened at a given time in a given container.

Traditional forensic systems may analyze logs in order to provide clues as to what machine or service was the initial entry point of an attacker. Because traditional container systems may not log events or processes running in a container, if the attacker's initial entry point were a container or a process running in a container, then no detailed traces may be left to analyze. Accordingly, the instant disclosure identifies and addresses a need for additional and improved systems and methods for logging processes within containers.

SUMMARY

As will be described in greater detail below, the instant disclosure describes various systems and methods for logging processes within containers by launching a monitoring process that records events within the container to a log and then exports the log to a host computing device live, at regular intervals, and/or in a single export before the container shuts down.

In one example, a computer-implemented method for logging processes within containers may include (i) detecting creation of a new container that includes a lightweight platform-independent filesystem capable of executing at least one process that is isolated from a host computing device that hosts the container, (ii) launching, within the new container, a monitoring process that maintains a log of events associated with a process that will be executing within the new container, (iii) recording to the log, by the monitoring process, data about at least one event associated with the process executing within the container, and (iv) exporting, by the monitoring process, the log to the host computing device that hosts the new container.

In some examples, launching the monitoring process may include launching the monitoring process before the process that will be executing within the new container has launched. In one example, the monitoring process may record data to the log about events associated with every process executing within the new container except the monitoring process. In some embodiments, the computer-implemented method may further include enabling an administrator of the new container to select whether the monitoring process records data to the log about events associated with only a single process executing within the new container or events associated with every process executing within the new container except the monitoring process.

In one embodiment, exporting, by the monitoring process, the log to the host computing device may include detecting, by the monitoring process, that the new container is about to shut down. In some embodiments, the data about the at least one event may include (i) metadata about the event, (ii) a timestamp of the event, (iii) a type of the event, (iv) network data associated with the event, (v) permissions required for the event, and/or (vi) filesystem data associated with the event.

In some examples, the computer-implemented method may further include enabling a forensic analyst to analyze the log for evidence of malicious activity. In these examples, the computer-implemented method may further include performing a security action in response to the analyst detecting the evidence of malicious activity by analyzing the log.

In one embodiment, a system for implementing the above-described method may include (i) a detection module, stored in memory, that detects the creation of a new container that includes a lightweight platform-independent filesystem capable of executing at least one process that is isolated from a host computing device that hosts the container, (ii) a launching module, stored in memory, that launches, within the new container, a monitoring process that maintains a log of events associated with a process that will be executing within the new container, (iii) a recording module, stored in memory, that records to the log, by the monitoring process, data about at least one event associated with the process executing within the container, (iv) an exporting module, stored in memory, that exports, by the monitoring process, the log to the host computing device that hosts the new container, and (v) at least one physical processor configured to execute the detection module, the launching module, the recording module, and the exporting module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect the creation of a new container that includes a lightweight platform-independent filesystem capable of executing at least one process that is isolated from a host computing device that hosts the container, (ii) launch, within the new container, a monitoring process that maintains a log of events associated with a process that will be executing within the new container, (iii) record to the log, by the monitoring process, data about at least one event associated with the process executing within the container, and (iv) export, by the monitoring process, the log to the host computing device that hosts the new container.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

FIG. 4 is a block diagram of an example log.

Figure 1:
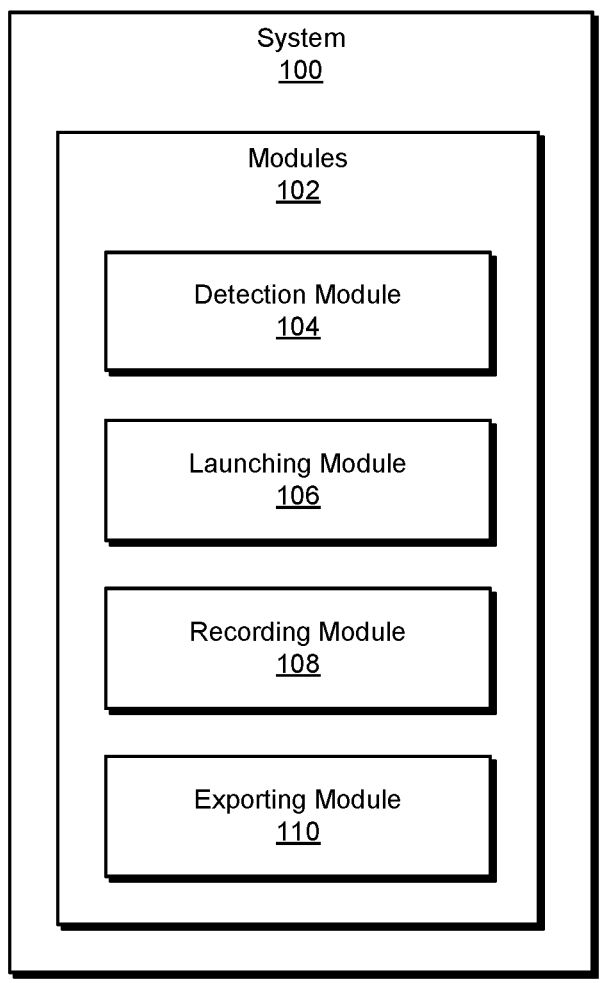
FIG. 1 is a block diagram of an example system for logging processes within containers.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for logging processes within containers. As will be explained in greater detail below, by recording events within a container to a log that is exported before the container is shut down, the systems and methods described herein may enable forensic analysts to examine events within containers for evidence of malicious activity that would otherwise be lost when the container shuts down.

Figure 2:
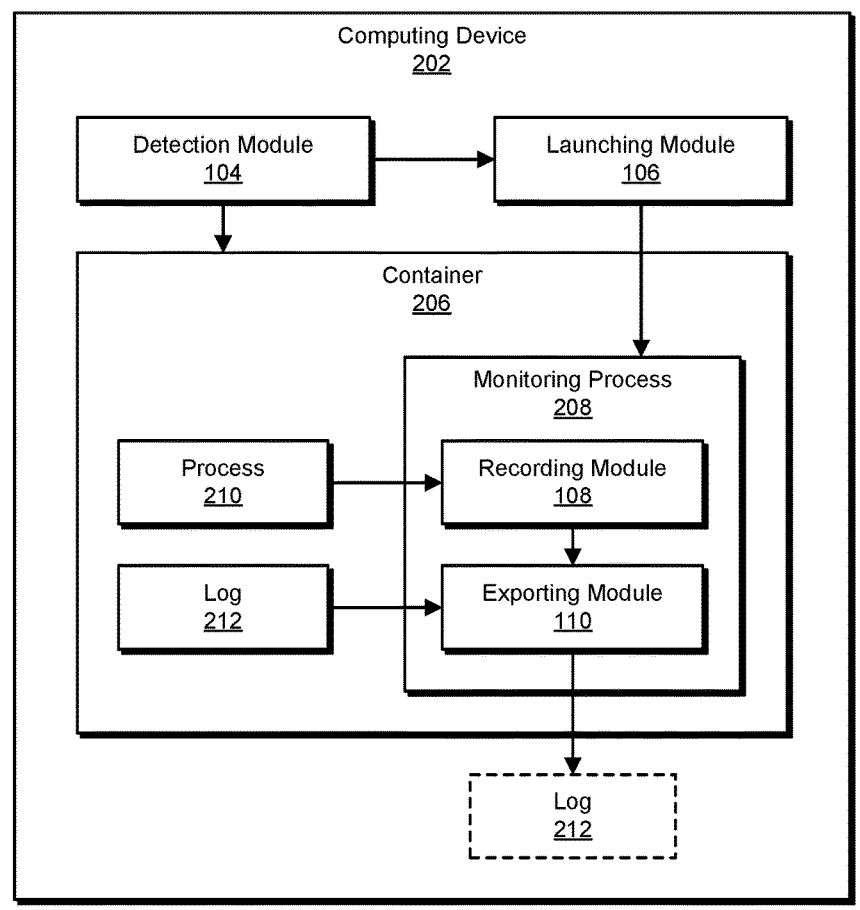
FIG. 2 is a block diagram of an additional example system for logging processes within containers.

The following will provide, with reference to FIGS. 1-2, detailed descriptions of example systems for logging processes within containers. Detailed descriptions of corresponding computer-implemented methods will also be provided in connection with FIGS. 3 and 5. Detailed descriptions of an example log will be provided in connection with FIG. 4. In addition, detailed descriptions of an example computing system and network architecture capable of implementing one or more of the embodiments described herein will be provided in connection with FIGS. 6 and 7, respectively.

FIG. 1 is a block diagram of example system 100 for logging processes within containers. As illustrated in this figure, example system 100 may include one or more modules 102 for performing one or more tasks. For example, and as will be explained in greater detail below, example system 100 may include a detection module 104 that detects the creation of a new container that includes a lightweight platform-independent filesystem capable of executing at least one process that is isolated from a host computing device that hosts the container. Example system 100 may additionally include a launching module 106 that launches, within the new container, a monitoring process that maintains a log of events associated with a process that will be executing within the new container. Example system 100 may also include a recording module 108 that records to the log, by the monitoring process, data about at least one event associated with the process executing within the container. Example system 100 may additionally include an exporting module 110 that exports, by the monitoring process, the log to the host computing device that hosts the new container. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or container 206), computing system 610 in FIG. 6, and/or portions of example network architecture 700 in FIG. 7. One or more of modules 102 in FIG. 1 may also represent all or portions of one or more special-purpose computers configured to perform one or more tasks.

Example system 100 in FIG. 1 may be implemented in a variety of ways. For example, all or a portion of example system 100 may represent portions of example system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to log processes within containers. For example, and as will be described in greater detail below, detection module 104 may detect the creation of a new container 206 that includes a lightweight platform-independent filesystem capable of executing at least one process 210 that is isolated from a host computing device 202 that hosts container 206. Next, launching module 106 may launch, within the new container 206, a monitoring process 208 that maintains a log 212 of events associated with process 210 that will be executing within container 206. Afterwards, recording module 108 may record to log 212, by monitoring process 208, data about at least one event associated with process 210 executing within container 206. At some later time, exporting module 110 may export, by monitoring process 208, log 212 to host computing device 202 that hosts container 206.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, example computing system 610 in FIG. 6, or any other suitable computing device.

Figure 3:
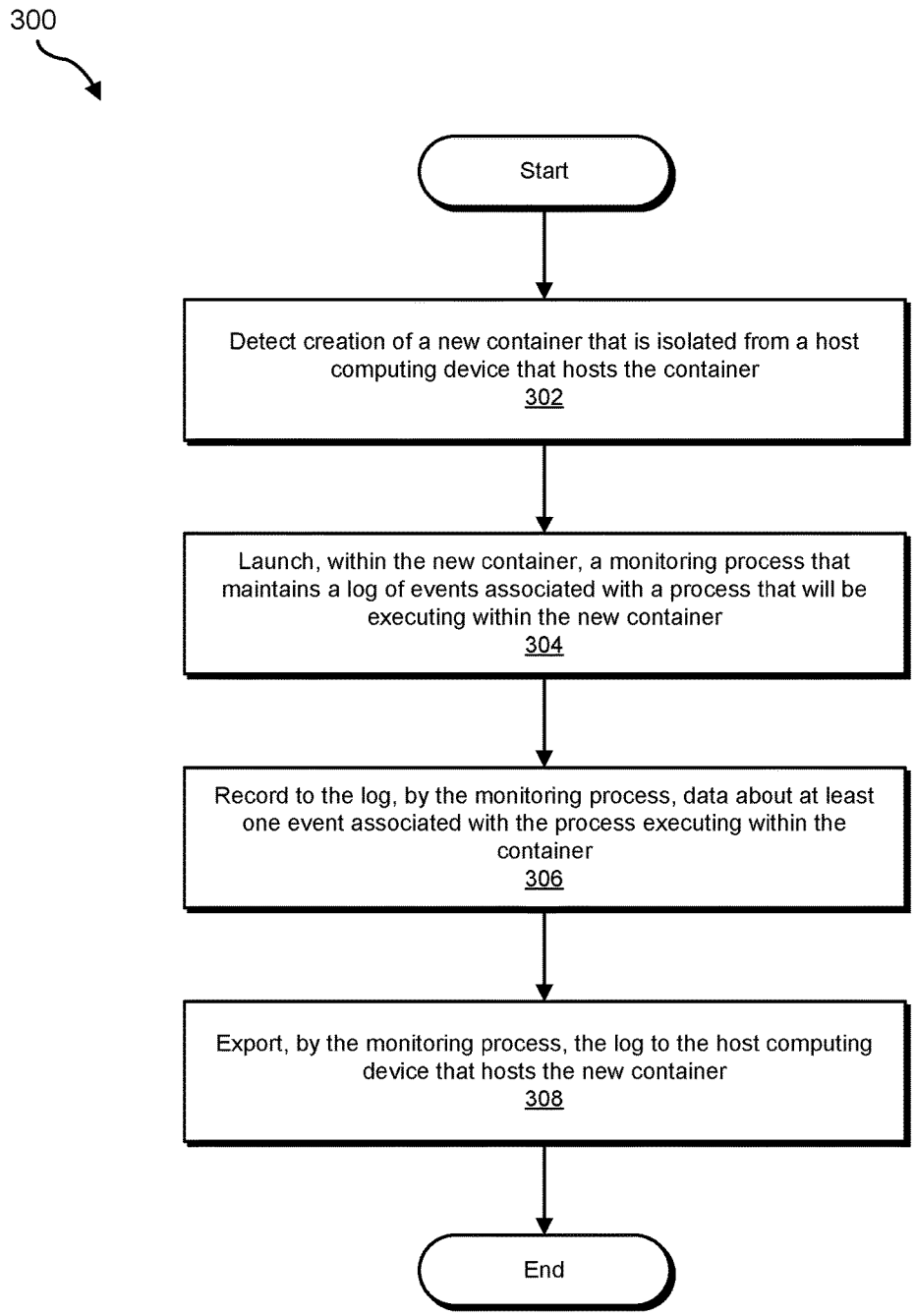
FIG. 3 is a flow diagram of an example method for logging processes within containers.

FIG. 3 is a flow diagram of an example computer-implemented method 300 for logging processes within containers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of example network architecture 700 in FIG. 7.

As illustrated in FIG. 3, at step 302, one or more of the systems described herein may detect the creation of a new container that may include a lightweight platform-independent filesystem capable of executing at least one process that is isolated from a host computing device that hosts the container. For example, detection module 104 may, as part of computing device 202 in FIG. 2, detect the creation of new container 206 that may include a lightweight platform-independent filesystem capable of executing at least one process 210 that is isolated from host computing device 202 that hosts container 206.

The term "container," as used herein, generally refers to any type of virtual environment that does not include an entire operating system but does include enough resources to execute at least one process and/or application. In some embodiments, the resources and/or processes within an application container may be isolated from resources and/or processes outside the application container. In some embodiments, a container may execute only a single process, while in other embodiments, a container may execute multiple processes.

The term "host" or "host computing device," as used herein, generally refers to any computing system capable of hosting one or more application containers. In some embodiments, a host may include physical hardware. Additionally or alternatively, a host may include a virtualized computing system. In some embodiments, a host may be a remotely managed server (i.e., on the cloud).

Detection module 104 may detect the creation of the new container in a variety of ways. For example, detection module 104 may be part of an application that creates the new container. In another embodiment, detection module 104 may monitor an application that creates containers in order to detect newly created containers. Additionally or alternatively, detection module 104 may monitor all processes on the host computing system in order to detect processes that represent newly created containers.

At step 304, one or more of the systems described herein may launch, within the new container, a monitoring process that maintains a log of events associated with a process that will be executing within the new container. For example, launching module 106 may, as part of computing device 202 in FIG. 2, launch, within container 206, monitoring process 208 that maintains log 212 of events associated with process 210 that will be executing within container 206.

The term "monitoring process," as used herein, generally refers to any process that monitors other processes and/or events and records information about those processes and/or events to a log. The term "log," as used herein, generally refers to any file or collection of files that includes information recorded about events and/or processes. In one example, a log may include a name of an event, a type of an event, an identifier of a process associated with an event, and/or a timestamp of an event. For example, as illustrated in FIG. 4, a log 402 may include event data such as event type, timestamp, permissions required, and/or name of any file and/or process involved. In some embodiments, a log may include a plain text file. In other embodiments, a log may include a full and/or a partial image of the container.

The term "event," as used herein, generally refers to any action that affects and/or is triggered by a process, file, application, network connection, and/or other computing object. Examples of an event include, without limitation, file creation, file modification, file deletion, process initialization, process termination, network connection initialization, network communication, network connection termination, and/or a call to memory.

Launching module 106 may launch the monitoring process in a variety of ways and/or contexts. For example, launching module 106 may launch the monitoring process by launching the monitoring process before the process that will be executing within the new container has launched. By launching the monitoring process first, launching module 106 may ensure that no actions taken by the process to be monitored are missed. In some examples, launching module 106 may launch the monitoring process by using a supervisor, hypervisor, and/or other container administration application to launch the monitoring process.

Returning to FIG. 3, at step 306, one or more of the systems described herein may record to the log, by the monitoring process, data about at least one event associated with the process executing within the container. For example, recording module 108 may, as part of computing device 202 in FIG. 2, record to log 212, by monitoring process 208, data about at least one event associated with process 210 executing within container 206.

Recording module 108 may record data in a variety of contexts. In one example, recording module 108 may record data about only one process executing within the container. In some embodiments, the container may be executing only one process aside from the monitoring process, while in other embodiments, an administrator and/or pre-configured settings may specify which process recording module 108 should record events for. In another example, recording module 108 may record data to the log about events associated with every process executing within the new container except the monitoring process.

In some embodiments, the systems described herein may enable an administrator of the new container to select whether the monitoring process records data to the log about events associated with only a single process executing within the new container or events associated with every process executing within the new container except the monitoring process. In some cases, recording events associated with every process may be too resource-intensive (e.g., in terms of processing power and/or memory) to be efficient and/or may be unnecessary. In other cases, an administrator may desire a detailed log of events within a container that executes multiple processes and/or the resource consumption of the monitoring process may be irrelevant. Additionally or alternatively, the systems described herein may enable an administrator to select whether only certain types of events (e.g., file events, network events) are recorded or whether all types of events on the container are recorded. In some embodiments, the systems described herein may record all events on the container by creating a complete filesystem image.

In one embodiment, the data about the event may include metadata about the event, a timestamp of the event, a type of the event, network data associated with the event (e.g., network addresses and/or ports of outbound and/or inbound traffic), permissions required for the event (e.g., read, write, and/or execute permissions), and/or filesystem data associated with the event (e.g., the file paths of any affected files).

At step 308, one or more of the systems described herein may export, by the monitoring process, the log to the host computing device that hosts the new container. For example, exporting module 110 may, as part of computing device 202 in FIG. 2, export, by monitoring process 208, log 212 to host computing device 202 that hosts container 206.

Exporting module 110 may export the log in a variety of contexts. For example, exporting module 110 may export the log to the host computing device in response to detecting, by the monitoring process, that the new container is about to shut down. In another example, exporting module 110 may export the log to the host computing device in response to a request from an administrator. In some embodiments, exporting module 110 may stream the log to a process and/or file on the host computing device as the log is updated. Additionally or alternatively, exporting module 110 may export the log or portions of the log at regular intervals, for example once per day.

In some embodiments, the systems described herein may enable a forensic analyst to analyze the log for evidence of malicious activity. For example, the systems described herein may make the log searchable, produce a data visualization of the log, correlate the data from the log with data from other logs, and/or parse the log data into a form usable by one or more analytics applications in order to enable a forensic analyst to analyze the log.

In some examples, the systems described herein may perform a security action in response to the analyst detecting the evidence of malicious activity by analyzing the log. For example, the systems described herein may update a whitelist and/or a blacklist for an anti-malware application, firewall, and/or security application, create a fingerprint, hash, signature, and/or other identifier of a malicious process, computing device, and/or file, and/or perform any other relevant security action.

Figure 5:
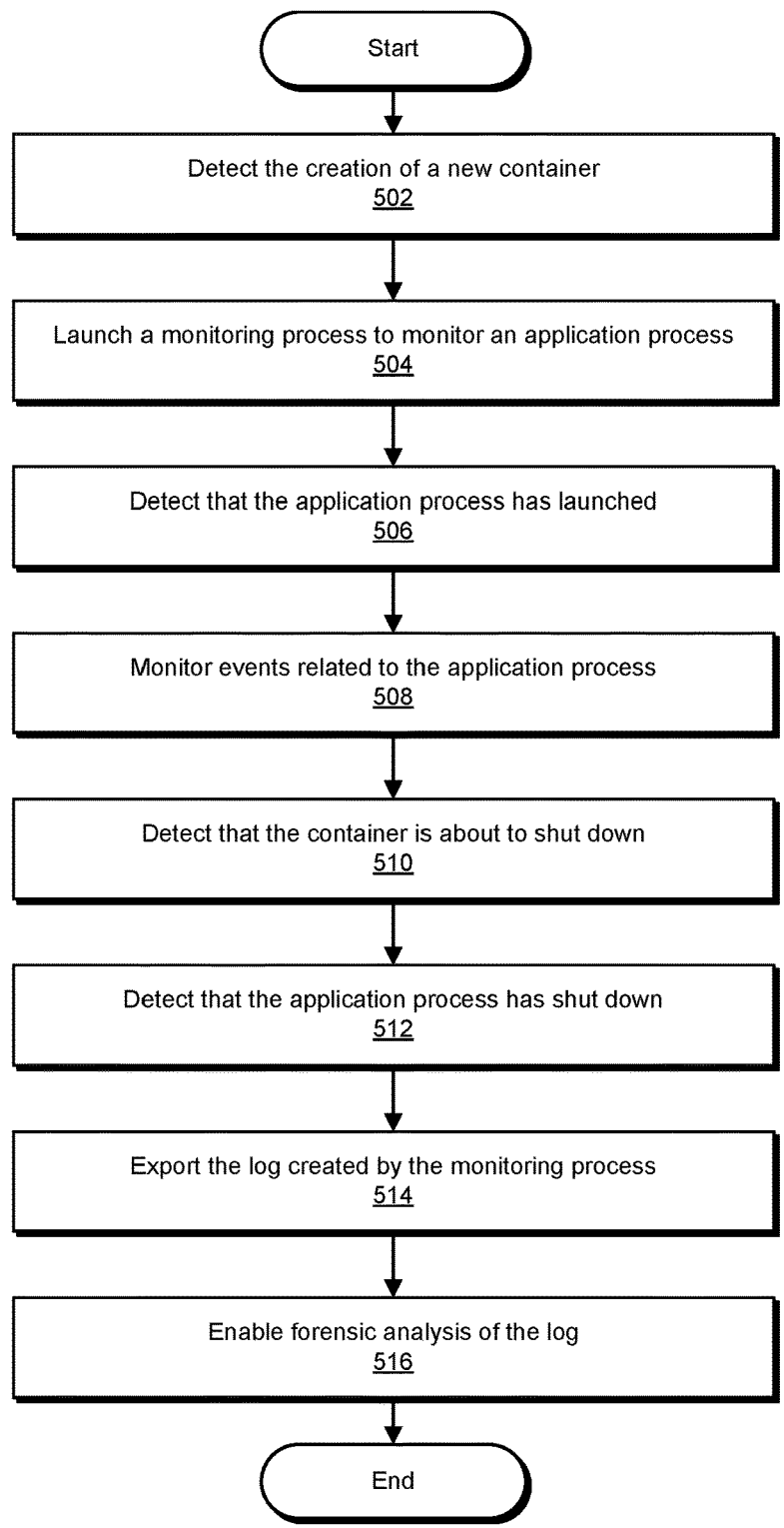
FIG. 5 is a flow diagram of an example method for logging processes within containers.

In some embodiments, the systems described herein may monitor activity on a container from the container's creation until its deletion. For example, as illustrated in FIG. 5, at step 502, the systems described herein may detect the creation of a new container. For example, the systems described herein may monitor all processes on a cloud server to detect when processes representing new containers appear. At step 504, the systems described herein may launch a monitoring process within the container to monitor an application process that is expected to execute within the container. In some examples, the systems described herein may monitor all processes executing within the container. At step 506, the systems described herein may detect that the application process has launched within the container and at step 508 the systems described herein may begin monitoring events related to the application process. In some examples, the systems described herein may periodically export some or all of the log.

At some later time, at step 510, the systems described herein may detect that the container is about to shut down. For example, the systems described herein may detect a shutdown signal sent to and/or within the container, determine that the container is expected to shut down soon based on a planned shut down time of the container, and/or determine in some other way that the container is about to shut down. In some examples, the systems described herein may detect that the container is about to shut down by detecting, at step 512, that the application process has shut down. The systems described herein may then, at step 514, export the log created by the monitoring process to the computing system that hosts the container. In some embodiments, the systems described herein may then send the log from the host computing system to some other computing system, such as a server that hosts a lot database. At step 516, the systems described herein may enable a forensic analysis of the log, for example in response to suspicions of malicious activity affecting and/or originating from the container.

As described in connection with method 300 above, the systems and methods described herein may keep track of changes that occur during the execution of a container. The systems described herein may operate in two potential modes: a lightweight, less fine-grained mode that does not require substantial storage space and a heavyweight mode that stores data about every process and requires substantial storage space. In the first, lightweight, mode, during the execution of the container the systems described herein load a monitoring process into the container and collect traces of exactly what process gets executed along with a timestamp. The first mode may also capture file write events. During the shutdown of the container, the systems described herein may export these traces onto the host file system. In some examples, the systems described herein may perform all of these steps automatically without user interaction. In the second, heavyweight, mode, the systems described herein may load the same process first into the container. However, once the container is shutdown, the systems described herein may trap the signal and all of the container changes along with the traces collected into a forensics repository. The systems described herein thus provide an analyst with the ability to log events taking place within containers while enabling a trade-off between granularity and storage space requirements.

Figure 6:
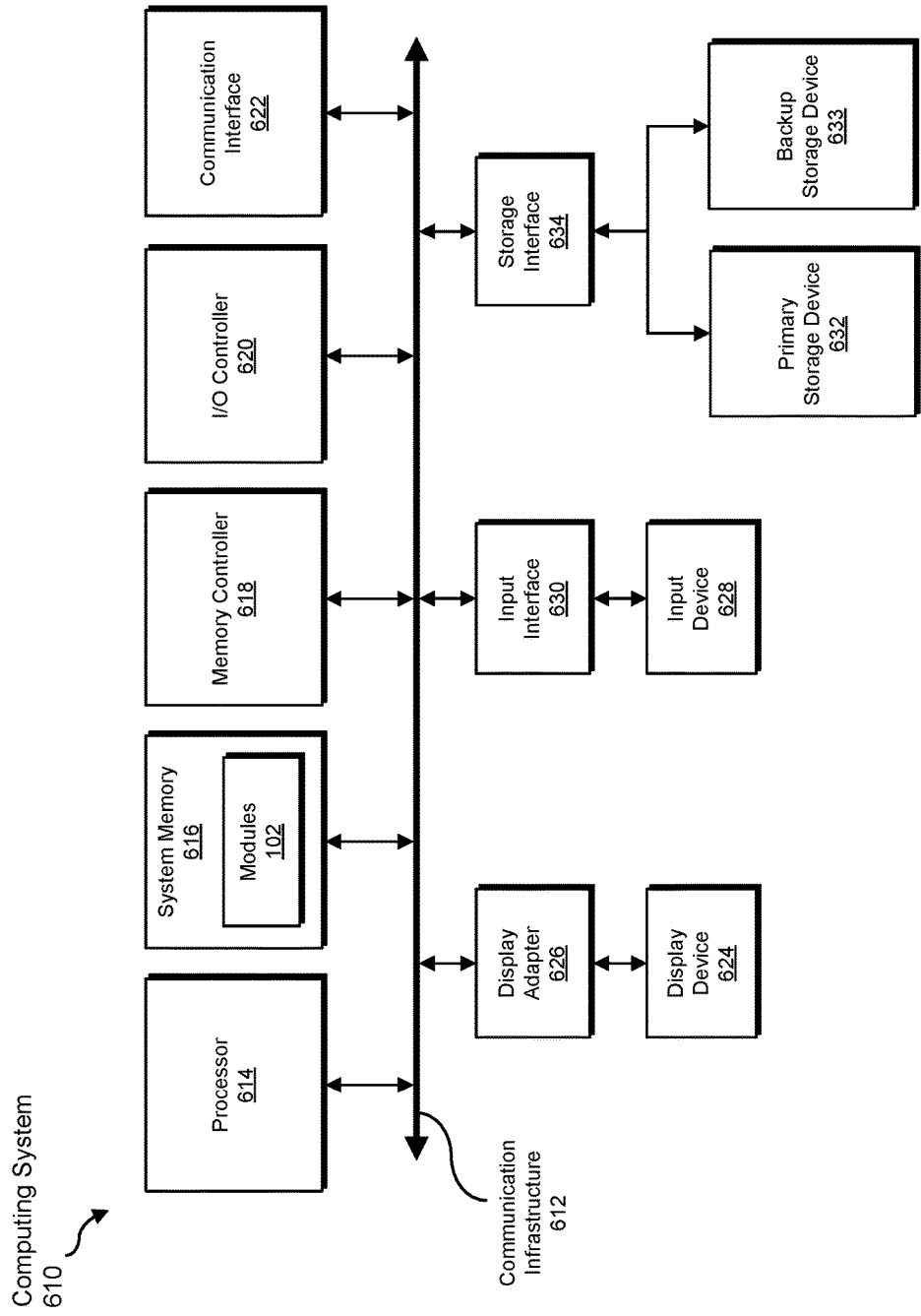
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to communication infrastructure 612 via an input interface 630. Input device 628 generally represents any type or form of input device capable of providing input, either computer or human generated, to example computing system 610. Examples of input device 628 include, without limitation, a keyboard, a pointing device, a speech recognition device, or any other input device.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
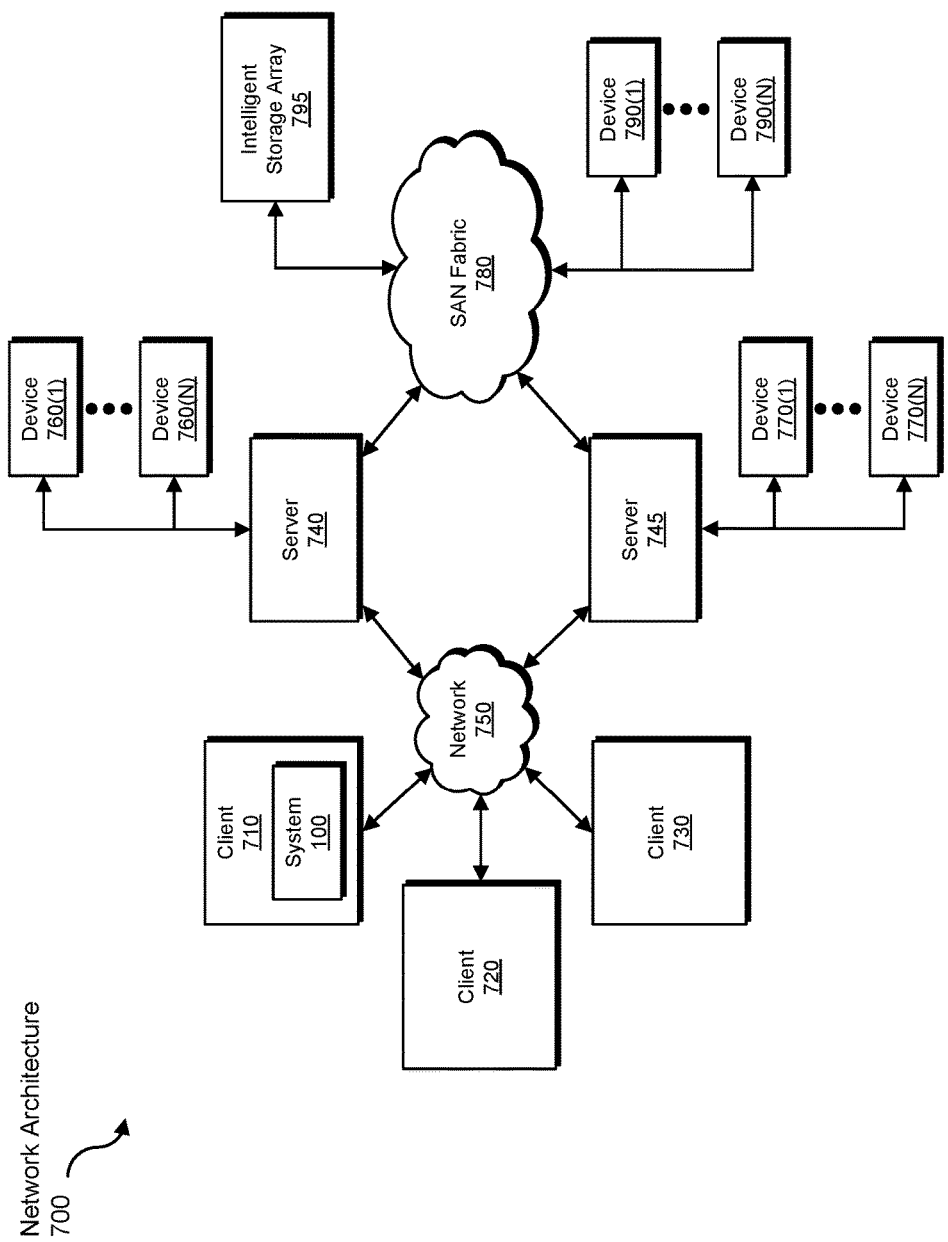
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for logging processes within containers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive event data to be transformed, transform the event data into log data, output a result of the transformation to a log, use the result of the transformation to analyze events, and store the result of the transformation to a database of logs. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for logging processes within containers, at least a portion of the method being performed by a computing device comprising at least one processor, the method comprising:
    detecting creation of a new container that comprises a lightweight platform-independent filesystem capable of executing at least one process that is isolated from a host computing device that hosts the container;
    launching, within the new container, a monitoring process that maintains a log of events associated with a process that will be executing within the new container;
    recording to the log, by the monitoring process, data about at least one event associated with the process executing within the new container, wherein the at least one event is associated with evidence of potentially malicious activity that would otherwise be lost when the new container shuts down; and
    exporting, by the monitoring process, the log to the host computing device that hosts the new container.

2. The computer-implemented method of claim 1, wherein launching the monitoring process comprises launching the monitoring process before the process that will be executing within the new container has launched.

3. The computer-implemented method of claim 1, wherein the monitoring process records data to the log about events associated with every process executing within the new container except the monitoring process.

4. The computer-implemented method of claim 1, further comprising enabling an administrator of the new container to select whether the monitoring process records data to the log about events associated with only a single process executing within the new container or events associated with every process executing within the new container except the monitoring process.

5. The computer-implemented method of claim 1, wherein exporting, by the monitoring process, the log to the host computing device comprises detecting, by the monitoring process, that the new container is about to shut down.

6. The computer-implemented method of claim 1, wherein the data about the at least one event comprises at least one of:
    metadata about the event;
    a timestamp of the event;
    a type of the event;
    network data associated with the event;
    permissions required for the event; and
    filesystem data associated with the event.

7. The computer-implemented method of claim 1, further comprising enabling a forensic analyst to analyze the log for evidence of malicious activity.

8. The computer-implemented method of claim 7, further comprising performing a security action in response to the analyst detecting the evidence of malicious activity by analyzing the log.

9. A system for logging processes within containers, the system comprising:
    a detection module, stored in memory, that detects creation of a new container that comprises a lightweight platform-independent filesystem capable of executing at least one process that is isolated from a host computing device that hosts the container;
    a launching module, stored in memory, that launches, within the new container, a monitoring process that maintains a log of events associated with a process that will be executing within the new container;
    a recording module, stored in memory, that records to the log, by the monitoring process, data about at least one event associated with the process executing within the new container, wherein the at least one event is associated with evidence of potentially malicious activity that would otherwise be lost when the new container shuts down;
    an exporting module, stored in memory, that exports, by the monitoring process, the log to the host computing device that hosts the new container; and
    at least one physical processor configured to execute the detection module, the launching module, the recording module, and the exporting module.

10. The system of claim 9, wherein the launching module launches the monitoring process by launching the monitoring process before the process that will be executing within the new container has launched.

11. The system of claim 9, wherein the monitoring process records data to the log about events associated with every process executing within the new container except the monitoring process.

12. The system of claim 9, wherein the recording module enables an administrator of the new container to select whether the monitoring process records data to the log about events associated with only a single process executing within the new container or events associated with every process executing within the new container except the monitoring process.

13. The system of claim 9, wherein the exporting module exports, by the monitoring process, the log to the host computing device by detecting, by the monitoring process, that the new container is about to shut down.

14. The system of claim 9, wherein the data about the at least one event comprises at least one of:
    metadata about the event;
    a timestamp of the event;
    a type of the event;
    network data associated with the event;
    permissions required for the event; and
    filesystem data associated with the event.

15. The system of claim 9, wherein the exporting module enables a forensic analyst to analyze the log for evidence of malicious activity.

16. The system of claim 15, wherein the exporting module performs a security action in response to the analyst detecting the evidence of malicious activity by analyzing the log.

17. A non-transitory computer-readable medium comprising one or more computer-readable instructions that, when executed by at least one processor of a computing device, cause the computing device to:
    detect creation of a new container that comprises a lightweight platform-independent filesystem capable of executing at least one process that is isolated from a host computing device that hosts the container;
    launch, within the new container, a monitoring process that maintains a log of events associated with a process that will be executing within the new container;
    record to the log, by the monitoring process, data about at least one event associated with the process executing within the new container, wherein the at least one event is associated with evidence of potentially malicious activity that would otherwise be lost when the new container shuts down; and
    export, by the monitoring process, the log to the host computing device that hosts the new container.

18. The non-transitory computer-readable medium of claim 17, wherein the one or more computer-readable instructions cause the computing device to launch the monitoring process by launching the monitoring process before the process that will be executing within the new container has launched.

19. The non-transitory computer-readable medium of claim 17, wherein the monitoring process records data to the log about events associated with every process executing within the new container except the monitoring process.

20. The non-transitory computer-readable medium of claim 17, wherein the one or more computer-readable instructions cause the computing device to enable an administrator of the new container to select whether the monitoring process records data to the log about events associated with only a single process executing within the new container or events associated with every process executing within the new container except the monitoring process.

* * * * *